(12) United States Patent
Yamaoka et al.

(10) Patent No.: US 10,489,699 B2
(45) Date of Patent: Nov. 26, 2019

(54) STICKER WITH IC TAG AND INSTALLATION METHOD THEREOF

(71) Applicant: TOPPAN PRINTING CO., LTD., Tokyo (JP)

(72) Inventors: Keinosuke Yamaoka, Tokyo (JP); Takamitsu Nakabayashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/914,607

(22) Filed: Mar. 7, 2018

(65) Prior Publication Data

US 2018/0197065 A1 Jul. 12, 2018

Related U.S. Application Data

(63) Continuation of application No. PCT/CN2016/098404, filed on Sep. 8, 2016.

(30) Foreign Application Priority Data

Sep. 8, 2015 (CN) .......................... 2015 1 0566380

(51) Int. Cl.
*G08B 13/14* (2006.01)
*G06K 19/077* (2006.01)
(Continued)

(52) U.S. Cl.
CPC ........ *G06K 19/07798* (2013.01); *B65B 57/00* (2013.01); *B65D 55/06* (2013.01);
(Continued)

(58) Field of Classification Search
CPC .... B65D 27/30; B65D 2101/00; B65D 55/06; B65D 95/028; G08B 13/24; G08B 13/2402; G06K 19/07798
(Continued)

(56) References Cited

U.S. PATENT DOCUMENTS 5,126,749 A 6/1992 Kaltner
9,016,588 B2 4/2015 Kaga
(Continued)

FOREIGN PATENT DOCUMENTS

CN 101001792 A 7/2007
CN 101128841 A 2/2008
(Continued)

OTHER PUBLICATIONS

International Search Report with English translation and Written Opinion issued in International Application No. PCT/CN2016/098404 dated Dec. 7, 2016.
(Continued)

*Primary Examiner* — Toan N Pham

(74) *Attorney, Agent, or Firm* — Foley & Lardner LLP

(57) ABSTRACT

A sticker with IC tag and an installation method thereof. The sticker with IC tag comprises: an antenna portion; and an IC chip coupled to the antenna portion and having a function of communicating through the antenna portion. The sticker with IC tag is installed on a covered container. The sticker with IC tag further comprises a disconnection detection portion, which is constituted by a ring conductor. The disconnection detection portion is installed so as to stretch across both a cover portion and a container body of the covered container. The IC chip is connected to the disconnection detection portion and has a function of detecting on and off of the disconnection detection portion.

11 Claims, 16 Drawing Sheets

(51) Int. Cl.
  *B65B 57/00* (2006.01)
  *B65D 55/06* (2006.01)
  *G06K 19/073* (2006.01)

(52) U.S. Cl.
  CPC ... *G06K 19/0776* (2013.01); *G06K 19/07372* (2013.01); *G06K 19/07758* (2013.01); *G06K 19/07786* (2013.01)

(58) Field of Classification Search
  USPC .................................................. 340/572.1, 5.8
  See application file for complete search history.

(56) References Cited

U.S. PATENT DOCUMENTS

| | | | |
|---|---|---|---|
| 9,471,817 B1* | 10/2016 | Alhazme | G06K 19/07345 |
| 9,495,851 B1* | 11/2016 | Russell | G06Q 10/00 |
| 9,715,606 B2* | 7/2017 | Russell | G06Q 10/00 |
| 2005/0012616 A1 | 1/2005 | Forster et al. | |
| 2005/0242957 A1 | 11/2005 | Lindsay et al. | |
| 2006/0145870 A1 | 7/2006 | Coveley et al. | |
| 2006/0152364 A1 | 7/2006 | Walton | |
| 2006/0214789 A1 | 9/2006 | Posamentier et al. | |
| 2007/0069895 A1 | 3/2007 | Koh | |
| 2007/0182564 A1 | 8/2007 | Abbott | |
| 2007/0210173 A1 | 9/2007 | Nagel | |
| 2008/0061153 A1 | 3/2008 | Hickle et al. | |
| 2009/0102664 A1 | 4/2009 | Puccini | |
| 2010/0308965 A1 | 12/2010 | Weitzhandler et al. | |
| 2015/0266634 A1 | 9/2015 | Yang | |
| 2015/0353234 A1* | 12/2015 | Yagishita | B65D 55/0818 206/216 |
| 2016/0023812 A1 | 1/2016 | Kikel | |
| 2016/0159535 A1 | 6/2016 | Diaz et al. | |
| 2016/0347513 A1 | 12/2016 | Coelho Ferreira | |
| 2017/0107120 A1 | 4/2017 | Sajid et al. | |
| 2018/0197060 A1* | 7/2018 | Yamaoka | G06K 19/073 |

FOREIGN PATENT DOCUMENTS

| | | |
|---|---|---|
| CN | 202529311 U | 11/2012 |
| CN | 203673507 U | 6/2014 |
| CN | 104411597 A | 3/2015 |
| DE | 10012204 A1 | 9/2001 |
| FR | 3021439 A1 | 11/2015 |
| JP | 3105286 U | 10/2004 |
| JP | 2006-123917 A | 5/2006 |
| JP | 2006-184082 A | 7/2006 |
| JP | 2007-102348 A | 4/2007 |
| JP | 2008-143589 A | 6/2008 |
| JP | 2014-012560 A | 1/2014 |
| JP | 2014-114070 A | 6/2014 |
| WO | WO-2004/032044 A1 | 4/2004 |
| WO | WO-2006/016559 A1 | 2/2006 |

OTHER PUBLICATIONS

Extended European Search Report dated Feb. 25, 2019 in corresponding application No. 16843662.4.

Extended European Search Report dated Mar. 29, 2019 in corresponding application 16843663.2.

International Searching Report, "International Search Report," issued in connection with International Patent Application No. PCT/CN2016/098406, dated Nov. 28, 2016.

International Searching Authority, "Written Opinion," issued in connection with International Patent Application No. PCT/CN2016/098406, dated Nov. 28, 2016.

International Searching Authority, "International Search Report," issued in connection with International Patent Application No. PCT/JP2017/044744, dated Mar. 20, 2018.

International Searching Authority, "Written Opinion," issued in connection with International Patent Application No. PCT/JP2017/044744, dated Mar. 20, 2018.

* cited by examiner

STICKER WITH IC TAG AND INSTALLATION METHOD THEREOF

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/CN2016/098404, filed on Sep. 8, 2016, which is based upon and claims the benefit of priority of CN 201510566380.X, filed Sep. 8, 2015, the entireties of which are hereby incorporated by reference.

FIELD

The present disclosure relates to a sticker with an IC tag and an installation method thereof, and more specifically to a sticker with IC tag and installation method thereof that may maintain the communication function of the IC tag and may detect the opening of a cover of a covered container such as a wine bottle when the cover is opened.

BACKGROUND

In the past, the global demand for goods management, logistics management, and authenticity determination of goods such as wines is increasing. As an IC tag used for goods management, logistics management, and true and false management, an RFID tag is known for communicating with a reader in a contactless manner so as to transfer information between the reader and the tag itself. An RFID tag is composed of an RFIC chip for processing wireless signals, and an antenna for transmitting and receiving the wireless signals. Specified information is transmitted and received between the antenna of the RFID tag and the antenna of the reader as high frequency signals through a magnetic field or electric wave.

However, in order to prevent the unlawful opening of the wine bottle or of the repeated use of the IC tag, the IC tag should be destroyed when the wine bottle is opened.

As a technique used to destroy the IC tag when opening the wine bottle as described above, for example, Patent Document 1 discloses the following sticker with IC tag and the adhering method thereof: the antenna is installed as stretching across both a metal cover and a container body, the antenna is destroyed when the cover is opened, the opening of the metal cover is detected through the condition of the antenna being destroyed. In order to destroy the antenna easily when opening the cover, the sticker with IC tag in Patent Document 1 adopts the following structure: namely, a brittle processing for cutting off a slit (or loop circuit) for impedance matching adjustment of the antenna is carried out.

Existing technical document: Patent Document 1: WO2006/016559

SUMMARY OF THE INVENTION

Technical Problem to be Solved by the Invention

However, while the sticker with IC tag of Patent Document 1 may detect the opening of a cover of a wine bottle by destroying an antenna containing an impedance adjustment circuit during the opening, communication cannot be continued after disconnection. On the other hand, there is a possibility of not being able to communicate under the circumstance that the IC tag has a malfunction. Therefore, it is uncertain whether the inability to communicate is caused by the opening during normal use or by the malfunction of the IC tag.

In addition, if the IC tag cannot communicate, then the information recorded in the IC tag (e.g., an individual number) cannot be read, thus goods management or authenticity management cannot be performed after the opening.

The present invention is provided in view of the above-mentioned problem, and its purpose is to provide a sticker with IC tag and the installation method thereof. The sticker with IC tag may detect the opening of a covered containing during the opening and may communicate even after the opening so that the information recorded in the IC tag may be read.

Technical Measures for Solving the Technical Problem

To solve the above-mentioned technical problem, the present disclosure provides a sticker with IC tag comprising: an antenna portion; and an IC chip bonded with the antenna portion and having a function of communicating through the antenna portion. The sticker with IC tag is installed on a covered container, characterized in that the sticker with IC tag further comprises a disconnection detection portion which is constituted by a ring conductor. The disconnection detection portion is installed so as to stretch across both a cover of the covered container and a container body. The IC chip is connected to the disconnection detection portion and has a function of detecting the on and off of the disconnection detection portion.

In addition, to solve the above-mentioned technical problem, an installation method of an sticker with IC tag involved in the present disclosure installs the sticker with IC tag to a covered container. The sticker with IC tag comprises: an antenna portion; and an IC chip bonded with the antenna portion and having a function of communicating through the antenna portion. The installation method of the sticker with IC tag is characterized in that the sticker with IC tag further comprises a disconnection detection portion which is constituted by a ring conductor. The IC chip is connected to the disconnection detection portion and has a function of detecting the on and off of the disconnection detection portion. When installing the sticker with IC tag to the covered container, the disconnection detection portion is installed so as to stretch across both a cover of the covered container and a container body.

Effect of Invention

According to the present disclosure, the following effects are achieved: since the IC tag identifies the opening (disconnection) of the covered container by merely cutting off the disconnection detection portion, communication with a reader can be performed even if the disconnection detection portion is cut off so that the reader can be used to read individual identification numbers such as the UID (User Identifier), EPC (Electric Product Code), etc. of the IC tag even after the opening.

DETAILED DESCRIPTION OF REPRESENTATIVE EMBODIMENTS

The present invention will be described by description of the following representative embodiments. It will be understood that the following embodiments are intended to be representative of the present invention and that the present invention is not necessarily limited to these representative embodiments.

In the following descriptions, the first embodiment of the present disclosure will be explained with reference to FIGS. 1 to 4.

First Embodiment

Figure 1A:
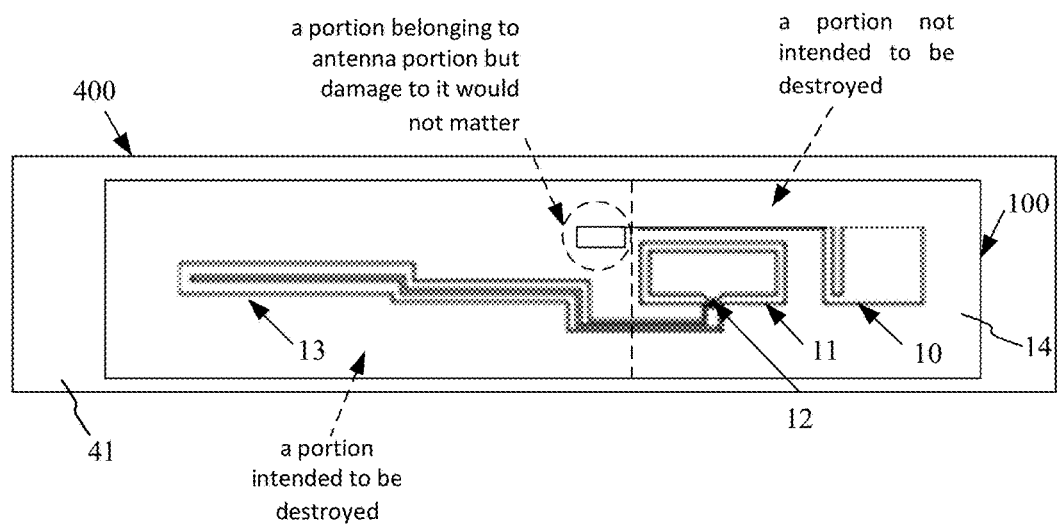
FIG. 1(A) is a top view showing the structure of a sticker with IC tag in UHF band involved in a first embodiment of the present disclosure.
Figure 1B:
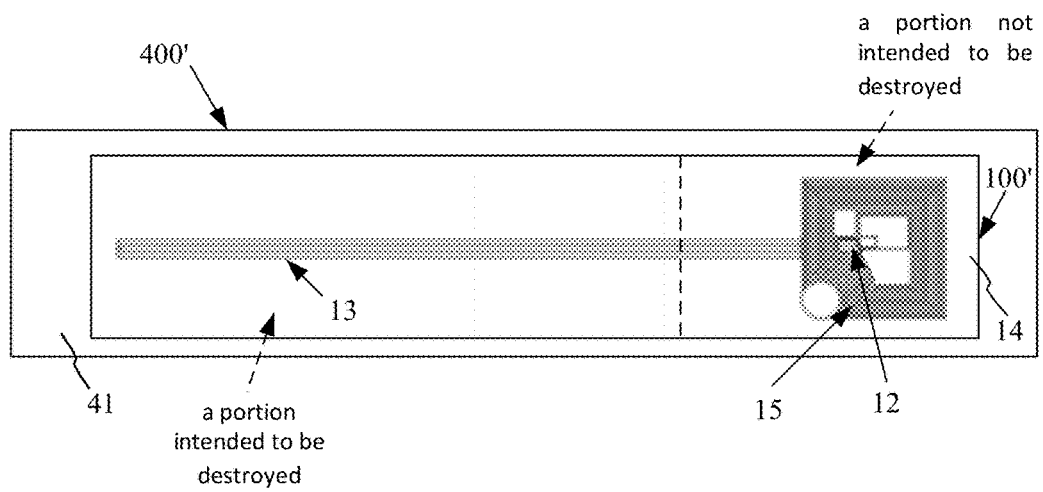
FIG. 1(B) is a top view showing the structure of a sticker with IC tag in HF band.

FIG. 1 is a top view showing the structure of a sticker with IC tag involved in the first embodiment of the present disclosure. FIG. 1(A) shows a sticker with IC tag 400 in UHF band. FIG. 1(B) shows a sticker with IC tag 400' in HF band.

As shown in FIG. 1(A), the sticker with IC tag 400 in UHF band comprises an IC tag insert 100, and a sheet-shaped tag paper 41 being a support for the sticker with IC tag 400. The IC tag insert 100 comprises: a radiation element 10 being an antenna; an impedance adjustment circuit 11, which adjusts the impedance matching of the antenna characteristics; an IC chip 12, an end of which is coupled to the impedance adjustment circuit 11; a disconnection detection circuit 13, which is coupled to the other end of the IC chip 12 and is constituted of a ring conductor; and a substrate 14, which is sheet-shaped and becomes a support for the radiation element 10, the impedance adjustment circuit 11, and the disconnection detection circuit 13. In addition, the radiation element 10 and the impedance adjustment circuit 11 form the antenna portion, which is used for communicating with an antenna of a reader (not illustrated).

In addition, the portion on the left of the dashed line of the IC tag insert 100 in FIG. 1(A) is a portion to be destroyed when opening a covered container 600 such as a wine bottle that has a sticker with IC tag adhered, and comprises a disconnection detection circuit 13. A portion on the right of the dashed line is a portion that is not intended to be destroyed when opening the covered container 600, and comprises a radiation element 10, an impedance adjustment circuit 11, and an IC chip 12.

In addition, as shown by the portion surrounded by a circular dashed block in FIG. 1(A), the radiation element 10 may also have a portion to which even a damage during opening would not matter. More specifically, the radiation element 10 is not intended to be destroyed. However, as long as the impedance adjustment circuit 11 is not cut off, communication may still be performed even through the best performance cannot be achieved. Therefore, it can be said that, even if the above portion surrounded by the circular dashed block is cut off in a scope that is not close to the impedance adjustment circuit 11, it would not matter.

As shown in FIG. 1(B), the sticker with IC tag 400' in HF band comprises an IC tag insert 100', and a sheet-shaped tag paper 41 being a support for the sticker with IC tag 400'. The IC tag insert 100' comprises: a loop circuit for antenna 15; an IC chip 12, an end of which is coupled to the loop circuit for antenna 15; a disconnection detection circuit 13, which is coupled to the other end of the IC chip 12 and is constituted of a ring conductor; and a substrate 14, which is sheet-shaped and becomes a support for the loop circuit for antenna 15 and the disconnection detection circuit 13. In addition, the loop circuit for antenna 15 forms the antenna portion, which is used for communicating with an antenna of a reader (not illustrated).

Further, the portion on the left of the dashed line of the IC tag insert 100' in FIG. 1(B) is a portion to be destroyed when opening a covered container 600, and comprises a disconnection detection circuit 13. A portion on the right of the dashed line is a portion that is not intended to be destroyed when opening the covered container 600, and comprises a loop circuit for antenna 15 and an IC chip 12.

Next, the adhering method of the sticker with IC tag of the present disclosure is described.

Figure 2:
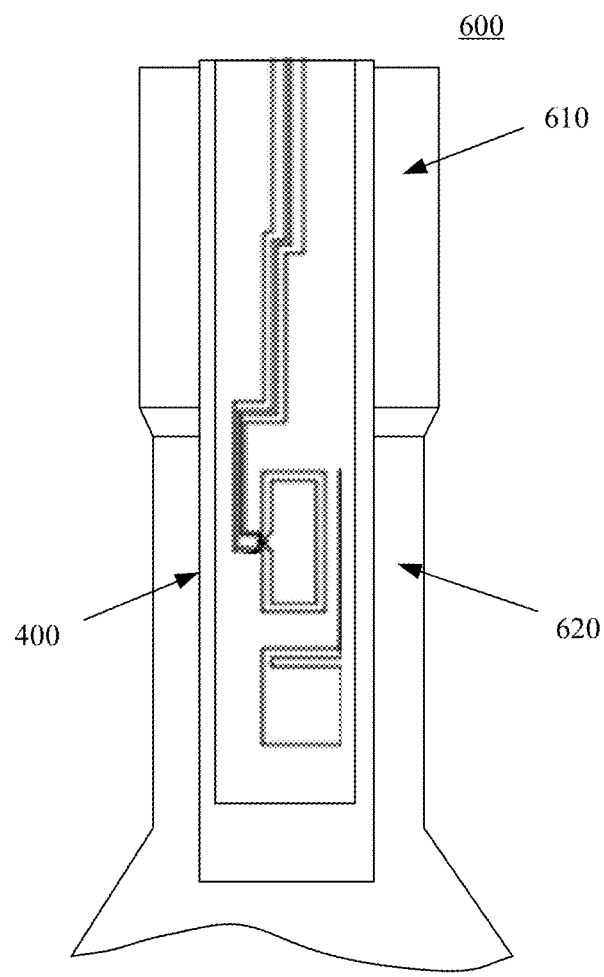
FIG. 2 is a brief top view illustrating the adhering method of a sticker with IC tag involved in the first embodiment of the present disclosure.

FIG. 2 is a brief top view illustrating the adhering method of a sticker with IC tag 400 involved in the present embodiment. The covered container 600 comprises a cover portion 610 and a container body 620. In the present embodiment, the covered container 600 is assumed to be a bottle with a metal cover that accommodates liquid such as vintage wine. In addition, the material of the cover portion 610 is assumed to be of a conductive material or materials, such as aluminum.

As shown in FIG. 2, the sticker with IC tag 400 in UHF band is adhered to the covered container 600 so that the disconnection detection circuit 13 stretches across both the cover 610 and the container body 620.

In the present embodiment, installation is made such that the impedance adjustment circuit 11 and the portion of the radiation element 10 that is close to the impedance adjustment circuit 11 do not stretch across both the cover portion 610 and the container body 620. The impedance adjustment circuit 11 and the portion of the radiation element 10 that is close to the impedance adjustment circuit 11 are installed on one side of the container body 620. However, in the case that for example the material of the cover portion 610 is not a conductive material but a non-conductive material such as plastic, the impedance adjustment circuit 11 and the portion of the radiation element 10 that is close to the impedance adjustment circuit 11 may also be installed on one side of the cover portion 610.

Further, FIG. 2 shows an adhering method of the sticker with IC tag 400 in UHF band. In addition, although not shown, the sticker with IC tag 400' in HF band also has the following structure, that is, the disconnection detection circuit 13 stretching across both the cover 610 and the container body 620.

Next, the brief structure of the IC chip of the present embodiment is described.

Figure 3:
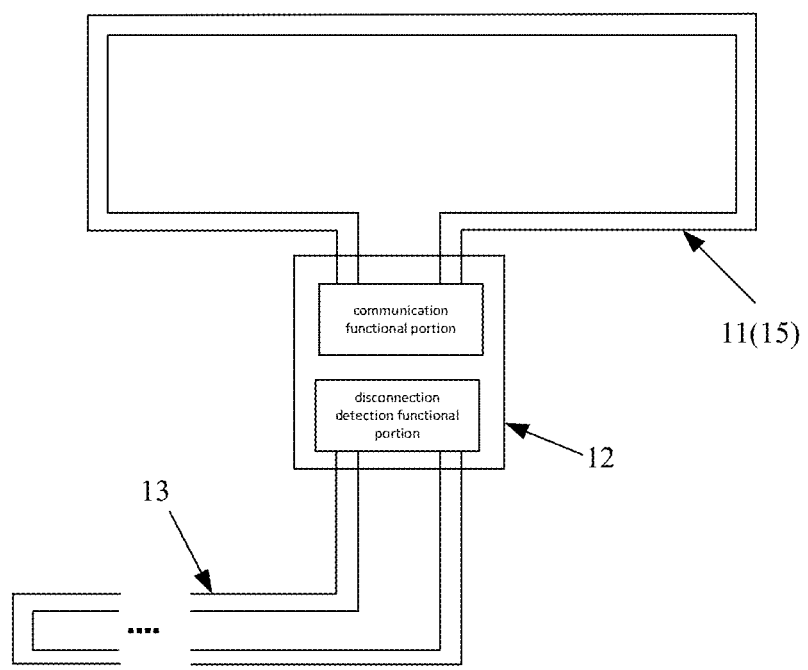
FIG. 3 is a brief structural view of a sticker with IC tag involved in the first embodiment of the present disclosure.

FIG. 3 is a brief structural view of an IC chip 12 involved in the present embodiment. The IC chip 12 comprises: a communication functional portion, which is connected to the impedance adjustment circuit 11 (UHF band) or the loop circuit for antenna 15 (HF band) and has a function of communicating with a reader (now shown); and a disconnection detection functional portion, which is connected to the disconnection detection circuit 13 and has a function of detecting on and off of the disconnection detection circuit 13.

In addition, in the present embodiment, the IC chip 12 utilizes UCODE G2iL+ produced by NXP Semiconductors Corporation, but is not limited to this. IC chips such as UCODE G2iM+ produced by NXP Semiconductors Corporation, NF4 by EM Microelectronic Corporation, etc. that detect disconnections using the resistance of the disconnection detection circuit other than antenna terminals may also be utilized.

The sticker with IC tag of the present embodiment, which has the above structure, comprises a disconnection detection circuit 13 that is installed in a manner that stretches across both the cover portion 610 and the container body 620. The IC chip 12 is connected to the disconnection detection circuit 13 and has a function of detecting on and off of the disconnection detection circuit 13. The impedance adjustment circuit 11 (UHF band) and the portion of the radiation element 10 that is close to the impedance adjustment circuit 11, or the loop circuit for antenna 15 (HF band) are installed in a manner that do not stretch across both the cover portion 610 and the container body 620. Therefore, the disconnection detection circuit 13 may be reliably destroyed when opening the covered container 600, while the antenna portion is not destroyed but can continue communication. Thus, the opening status after opening the covered container may be identified, and a reader may be used to read individual numbers of the IC tag such as UID, EPC, etc. so that goods management, logistics management, and authenticity determination may be performed.

Next, the structure of the antenna portion of the sticker with IC tag involved in the present embodiment is described in detail.

FIG. 4 is a conceptual diagram illustrating in detail the structure of the antenna portion of the sticker with IC tag involved in the present embodiment. The structure of FIG. 4(A) corresponds to that of FIG. 1(A). As shown in FIG. 4(A), the antenna portion is constituted by a radiation element 10 and an impedance adjustment circuit 11. The impedance adjustment circuit 11 is a loop-type impedance adjustment circuit, and is in electrical connection with the radiation element 10.

Figure 4A:
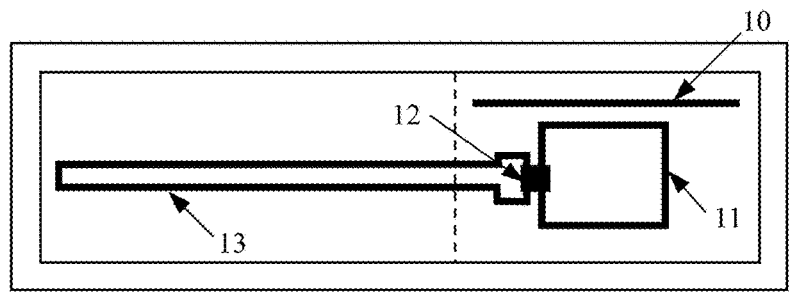
FIGS. 4(A) to 4(D) are conceptual diagrams illustrating in detail the structure of the antenna portion of the sticker with IC tag involved in the first embodiment of the present disclosure.
Figure 4B:
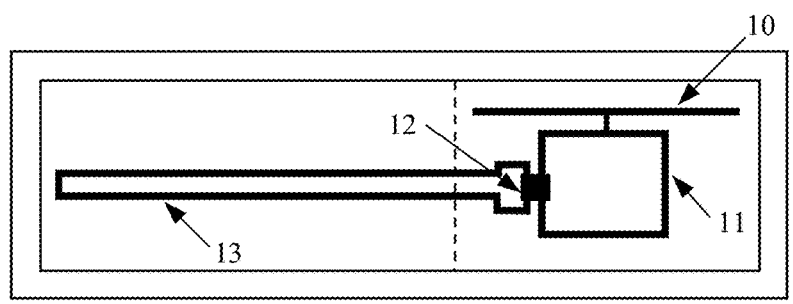

Further, as shown in FIG. 4(B), the antenna portion is constituted by a radiation element 10 and an impedance adjustment circuit 11. The impedance adjustment circuit 11 is a loop-type impedance adjustment circuit, and is in electrical and physical connection with the radiation element 10.

Figure 4C:
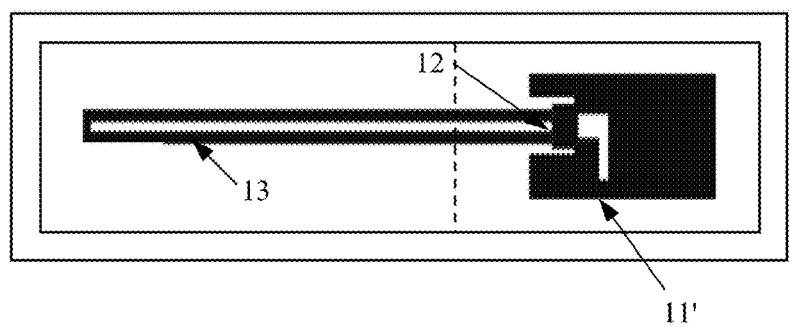

Further, as shown in FIG. 4(C), the antenna portion is constituted by an impedance adjustment circuit 11', which may also be a slot-type impedance adjustment circuit.

Figure 4D:
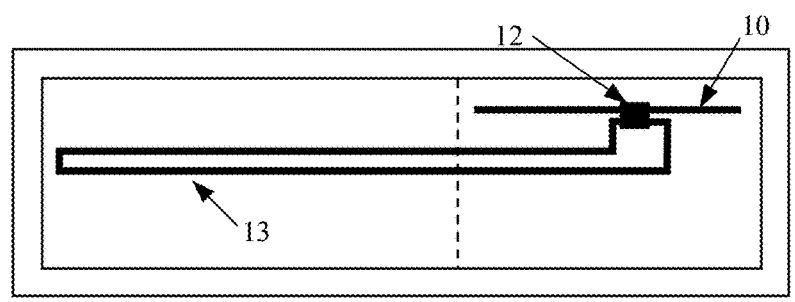

Further, as shown in FIG. 4(D), the antenna portion may comprise radiation electrode 10 only but does not have an impedance adjustment circuit 11, where the radiation electrode 10 is directly connected to the IC chip 12.

In the following description, the first through third embodiments of the present disclosure will be explained with reference to FIGS. 5 to 6.

First Embodiment

Figure 5A:
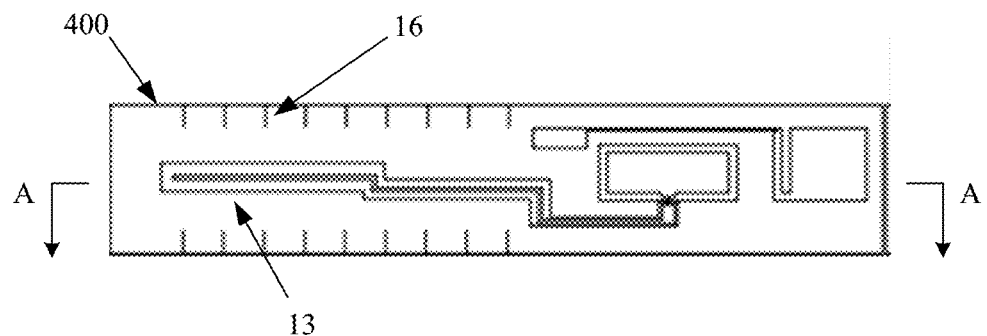
FIG. 5(A) is a top view of the structure of the sticker with IC tag in UHF band involved in the first embodiment of the present disclosure.
Figure 5B:
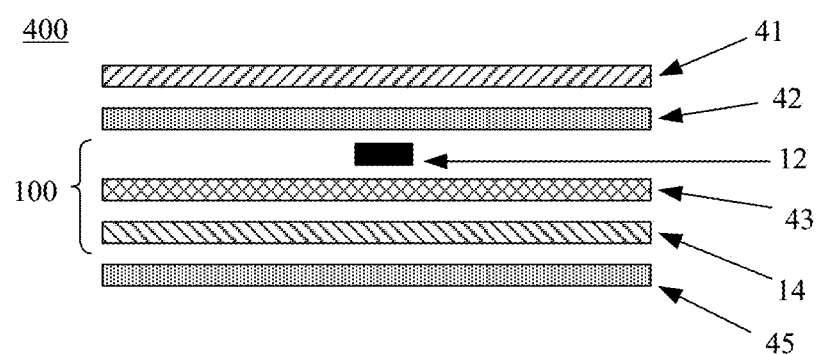
FIG. 5(B) is a brief sectional view of the sticker with IC tag in UHF band that is sectioned along the A-A line shown in FIG. 5(A).
Figure 5C:
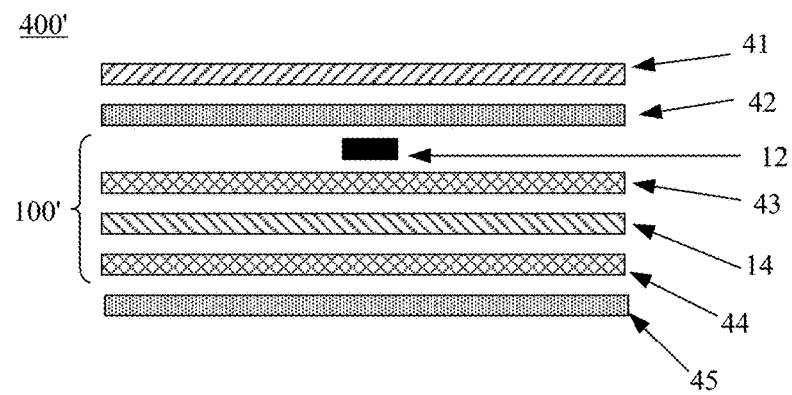
FIG. 5(C) is a brief sectional view of the sticker with IC tag in HF band.

FIG. 5(A) is a top view of the structure of the sticker with IC tag 400 in UHF band involved in the first embodiment. FIG. 5(B) is a brief sectional view of the sticker with IC tag 400 in UHF band that is sectioned along the A-A line shown in FIG. 5(A). FIG. 5(C) is a brief sectional view of the sticker with IC tag 400' in HF band.

When opening the covered container, it is required to make the disconnection detection circuit 13 easy to be disconnected. Therefore, the sticker with IC tag has a structure wherein disconnection assistance machining is performed on the periphery of the disconnection detection circuit 13.

The sticker with IC tag 400 in UHF band shown in FIG. 5(B) comprises a tag paper 41. IC tag insert 100 is adhered to the back of the tag paper 41 with an adhesion layer 41 intervening. In the IC tag insert 100, a conductive layer 43, which comprises the radiation element 10, the impedance adjustment circuit 11, and the disconnection detection circuit 13 shown in FIG. 1(A), is formed on one side of the substrate 14. An IC chip 12 is disposed on the conductive layer 43. An adhesion layer 45 is coated on and covering the remaining portion of the back of the tag paper 41 and on the IC tag insert 100.

The sticker with IC tag 400' in HF band in FIG. 5(C) differs from the sticker with IC tag 400 in UHF band in FIG. 5(B) in the structure of the IC tag insert 100'. In the IC tag insert 100', conductor layers 43 and 44 comprising the loop circuit for antenna 15 and the disconnection detection circuit 13 as shown in FIG. 1(B) are respectively formed on two sides of the substrate 14, where an IC chip 12 is disposed on the conductor layer 43.

Further, in the present embodiment, the substrate 14 can be for example PET film. The conductor layers 43, 44 can be for example metal such as aluminum. Further, as desired or needed, trademarks or artistic patterns may also be printed on the surface of the tag paper 41.

Further, the orientation of the IC tag insert 11 in FIGS. 5(B) and 5(C) is merely an example, an opposite orientation is possible. The following embodiments 2 to 4 have similar characteristics.

In the present embodiment, as an example of the disconnection assistance machining, as shown in FIG. 5(A), a plurality of incisions 16 are formed on the substrate 14 and the tag paper 41 surrounding the disconnection detection circuit 13. The plurality of incisions 16 are formed for example from an end of the sticker with IC tag 400 towards the disconnection detection circuit 13. Further, disconnection assistance effects may be achieved even if the incisions 16 do not reach the disconnection detection circuit 13.

According to the present first embodiment, since the disconnection detection circuit 13 is easier to be disconnected as compared to the antenna portion during the opening, the disconnection detection circuit may be reliably destroyed while protecting the antenna portion.

Second Embodiment

Figure 6A:
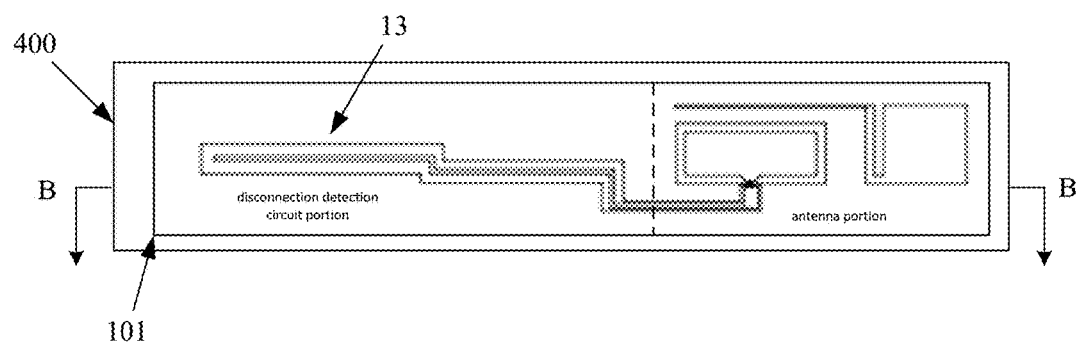
FIG. 6(A) is a top view of the structure of the sticker with IC tag in UHF band involved in a second embodiment of the present disclosure.
Figure 6B:
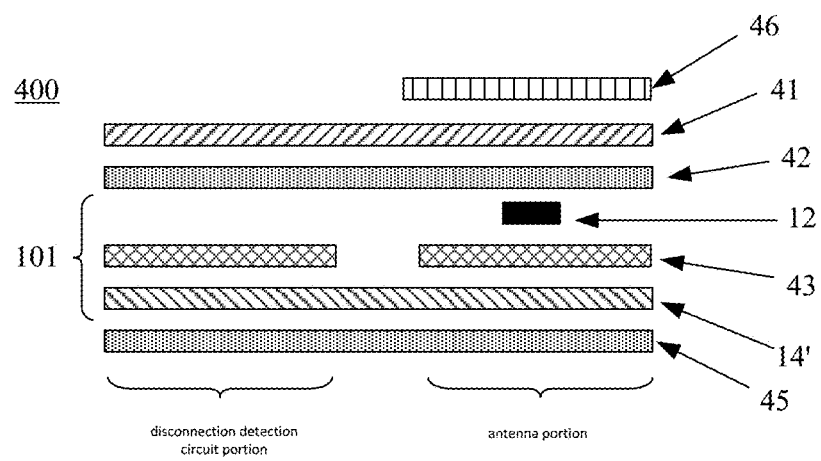
FIG. 6(B) is a brief sectional view of the sticker with IC tag in UHF band that is sectioned along the B-B line shown in FIG. 6(A).
Figure 6C:
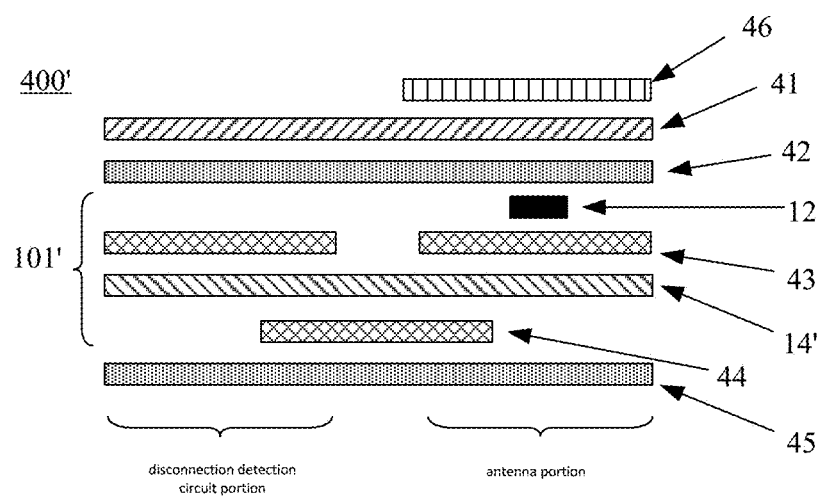
FIG. 6(C) is a brief sectional view of the sticker with IC tag in HF band.

FIG. 6(A) is a top view of the structure of the sticker with IC tag 400 in UHF band involved in the second embodiment. FIG. 6(B) is a brief sectional view of the sticker with IC tag 400 in UHF band that is sectioned along the B-B line shown in FIG. 6(A). FIG. 6(C) is a brief sectional view of the sticker with IC tag 400' in HF band.

The sticker with IC tag 400 in UHF band shown in FIGS. 6(A), 6(B) comprises a tag paper 41. IC tag insert 101 is adhered to the back of the tag paper 41 with an adhesion layer 42 intervening. In the IC tag insert 101, a conductive layer 43, which comprises the radiation element 10, the impedance adjustment circuit 11, and the disconnection detection circuit 13 shown in FIG. 1(A), is formed on one side of the substrate 14'. An IC chip 12 is disposed on the conductive layer 43. An adhesion layer 45 is coated on the remaining portion of the back of the tag paper 41 and on the IC tag insert 101.

The sticker with IC tag 400' in HF band in FIG. 6(C) differs from the sticker with IC tag 400 in UHF band in FIG. 6(B) in the structure of the IC tag insert 101'. In the IC tag insert 101', conductor layers 43 and 44 comprising the loop circuit for antenna 15 and the disconnection detection circuit 13 as shown in FIG. 1(B) are respectively formed on two sides of the substrate 14', where an IC chip 12 is disposed on the conductor layer 43.

Further, metal foils or metal ink, for example, may also be used as conductor layers 43 and 44.

In the present embodiment, as another example of disconnection assistance machining, the substrate 14' is constituted by brittle materials such as paper, brittle film, etc.

Further, as shown in FIGS. 6(A) to 6(C), in the present embodiment, the IC tag inserts 101, 101' are constituted by a disconnection detection circuit and an antenna portion. To prevent the antenna portion being disconnected during the opening, enhanced machining shall be performed on the periphery of the antenna portion.

As an example of the enhanced machining, for example as shown in FIGS. 6(B) and 6(C), for the antenna portion of the IC tag inserts 101, 101', an enhanced layer 46 is formed on the surface of the tag paper 41. Further, although not shown, the enhanced layer 46 may also be formed between the tag paper 41 and the antenna portion, for example between the tag paper 41 and the adhesion layer 42.

Further, in the present second embodiment, similarly as in the first embodiment, a plurality of incisions may be formed on the substrate 14' and the tag paper 41.

The second embodiment is similar to the first embodiment in that the disconnection detection circuit may be reliably destroyed during opening while protecting the antenna portion.

Third Embodiment

Figure 7A:
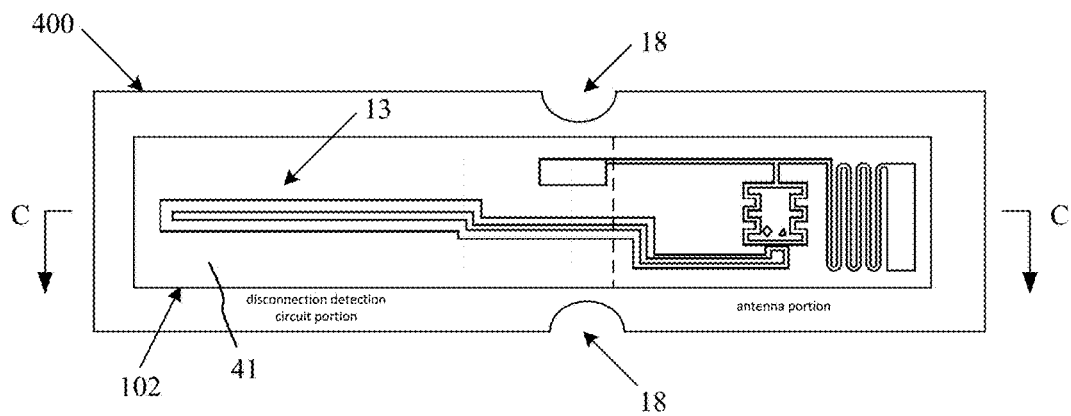
FIG. 7(A) is a top view of the structure of the sticker with IC tag involved in a third embodiment of the present disclosure.
Figure 7B:
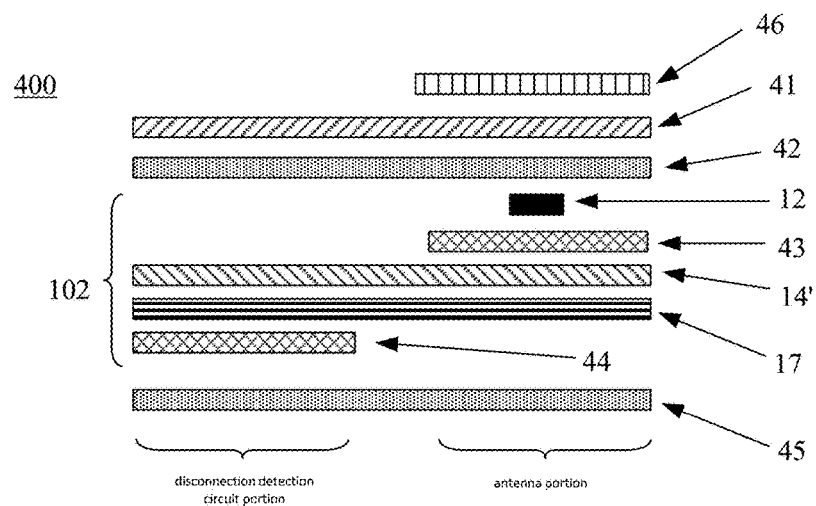
FIG. 7(B) is a brief sectional view of the sticker with IC tag that is sectioned along the C-C line shown in FIG. 7(A).

FIG. 7(A) is a top view of the structure of the sticker with IC tag 400 involved in the third embodiment. FIG. 7(B) is a brief sectional view of the sticker with IC tag 400 that is sectioned along the C-C line shown in FIG. 7(A).

As shown in FIG. 7(B), the sticker with IC tag 400 comprises a tag paper 41. IC tag insert 102 is adhered to the back of the tag paper 41 with an adhesion layer 42 intervening. The IC tag insert 102 comprises a substrate 14' and a brittle layer 17. A conductive layer 43, which comprises a radiation element 10 and an impedance adjustment circuit 11, is formed on one side of the substrate 14'. A conductive layer 44 comprising a disconnection detection circuit 13 is formed on one side of the brittle layer 17. The other side of the substrate 14' is bonded with the other side of the brittle layer 17 so that the two may be easily stripped from each other. An IC chip 12 is disposed on the conductive layer 43. An adhesion layer 45 is coated on the remaining portion of the back of the tag paper 41 and on the IC tag insert 102.

Further, as shown in FIGS. 7(A) and 7(B), in the present embodiment, the IC tag insert 102 is constituted by a disconnection detection circuit and an antenna portion. The conductive layer 43 is disposed in the antenna portion, and the conductive layer 44 is disposed in the disconnection detection circuit.

In the present embodiment, when opening a covered container, if it is intended to strip off the tag paper 41 from the side of the disconnection detection circuit (left side shown in FIG. 7(B)), the substrate 14' is separated from the brittle layer 17, and the disconnection detection circuit 13 is destroyed at the first place.

However, if stripping continues, strength will be conducted to the antenna portion so that the antenna portion would possibly be destroyed. As an enhanced machining for addressing the above issue, as shown in FIG. 7(A), the tag paper 41 of the present embodiment may have the following structure: that is, a structure to avoid the strength being conducted on the boundary between the antenna portion and the disconnection detection circuit. As an example of the structure, the tag paper 400 have two breaches 18, which are approximately semi-circular, formed on the boundary between the antenna portion and the disconnection detection circuit.

According to the above structure, the disconnection detection circuit may be reliably destroyed during opening while protecting the antenna portion.

In the following description, the second embodiment of the present disclosure will be explained with reference to FIGS. 8 to 9.

Second Embodiment

Figure 8A:
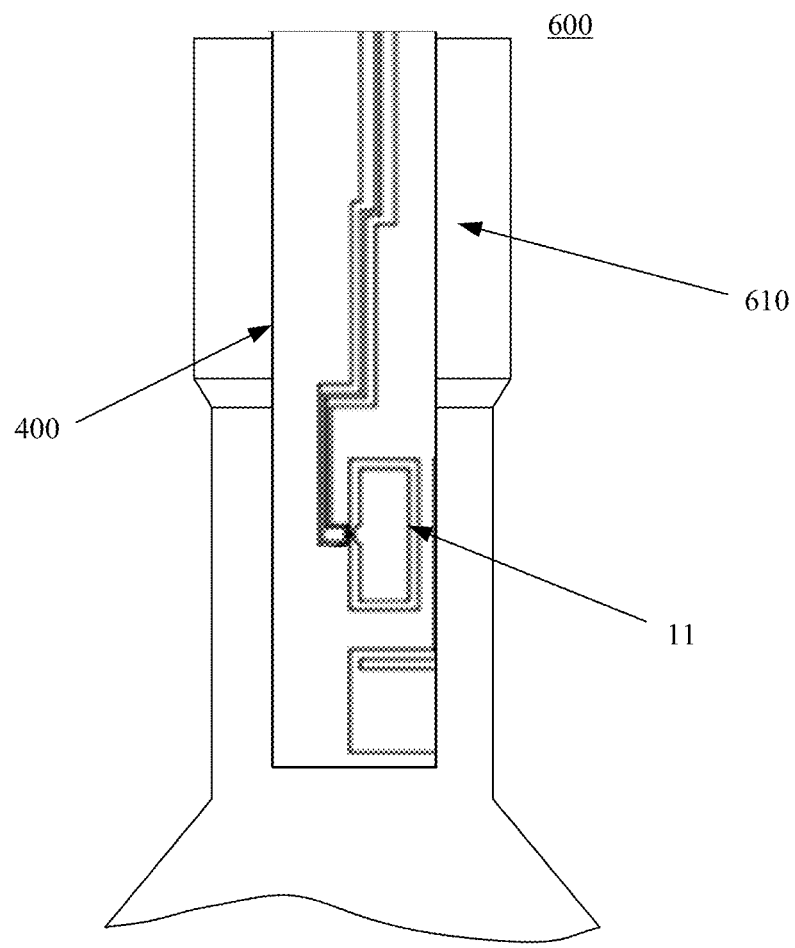
FIGS. 8(A) to 8(C) are brief top views illustrating the adhering method of the sticker with IC tag in UHF band involved in the second embodiment of the present disclosure.
Figure 8B:
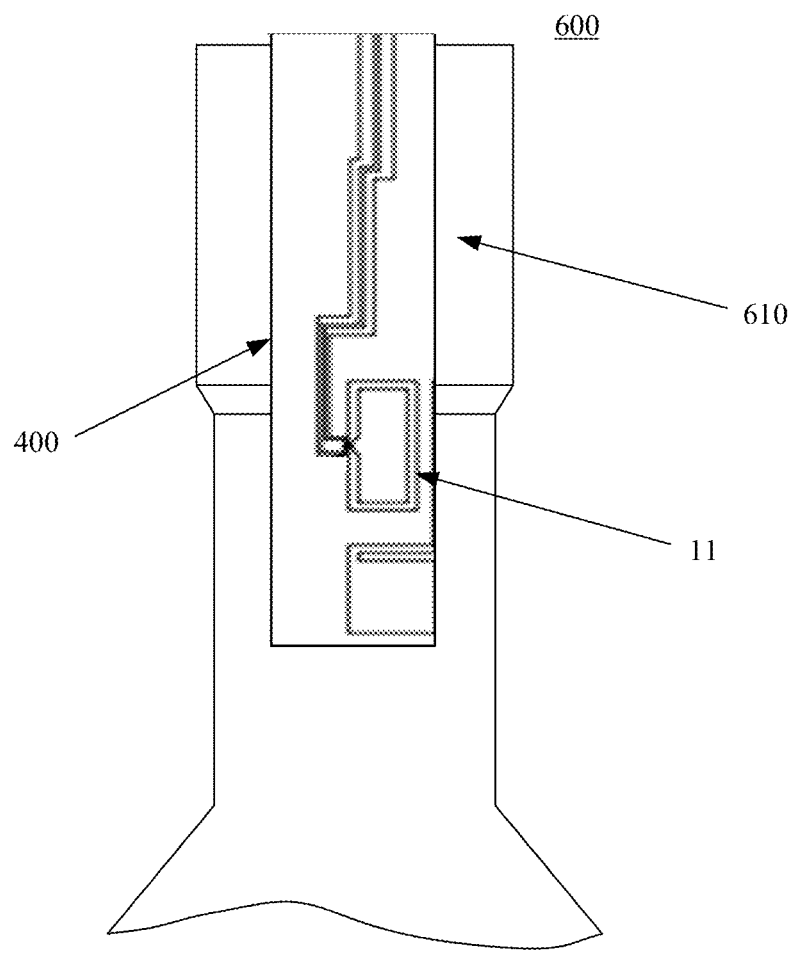
Figure 8C:
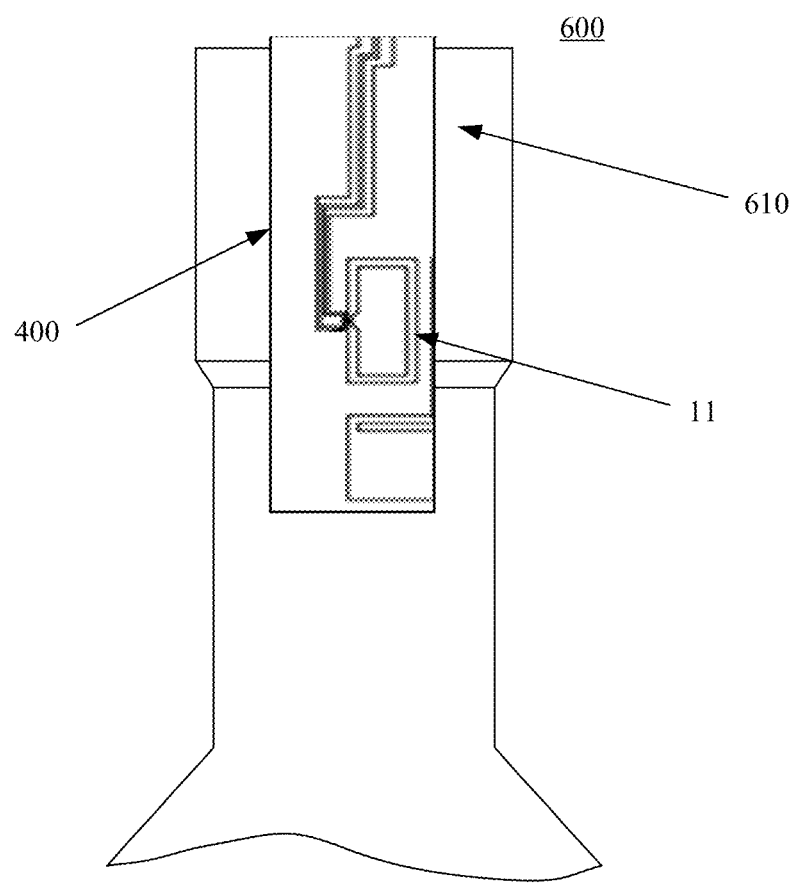
Figure 9A:
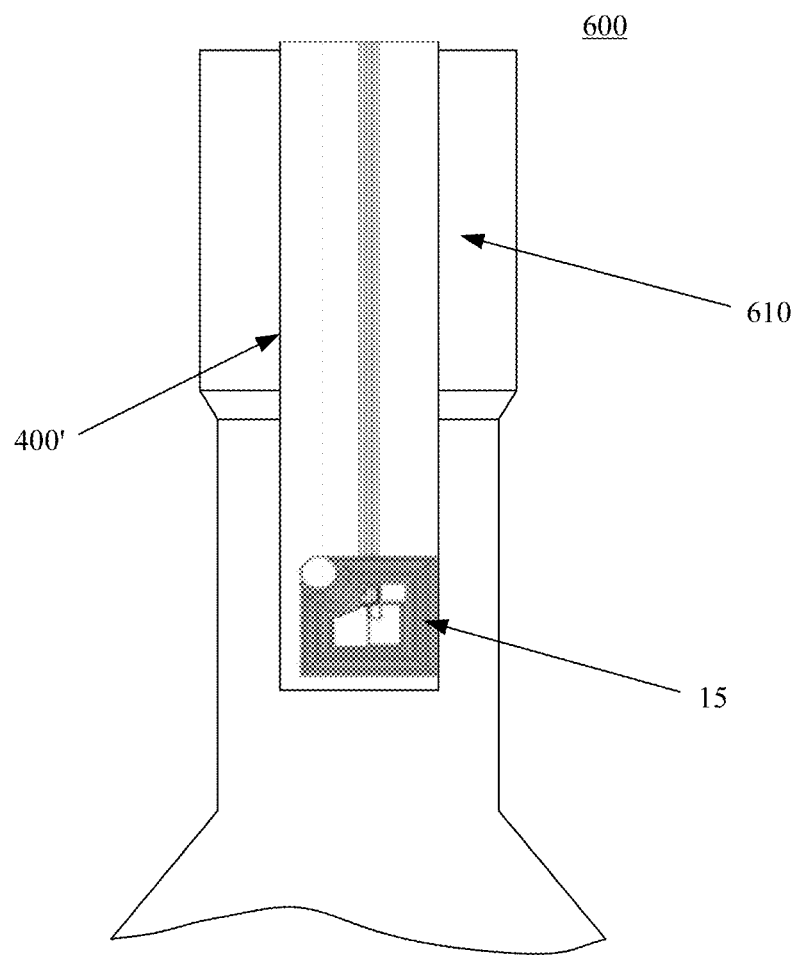
FIGS. 9(A) to 9(C) are brief top views illustrating the adhering method of the sticker with IC tag in HF band involved in the second embodiment of the present disclosure.
Figure 9B:
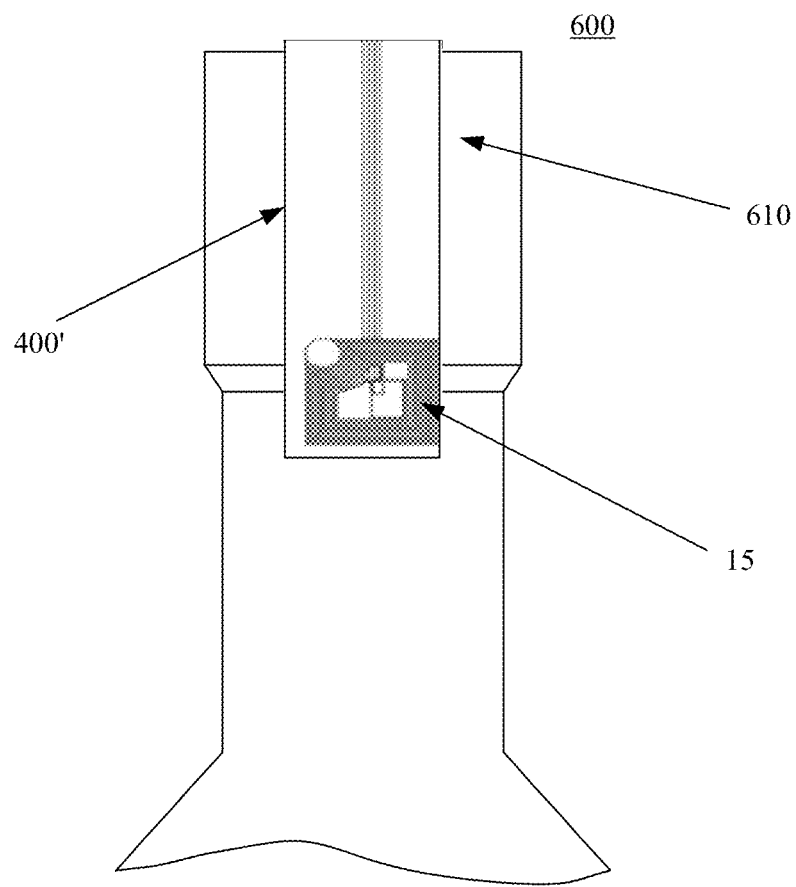
Figure 9C:
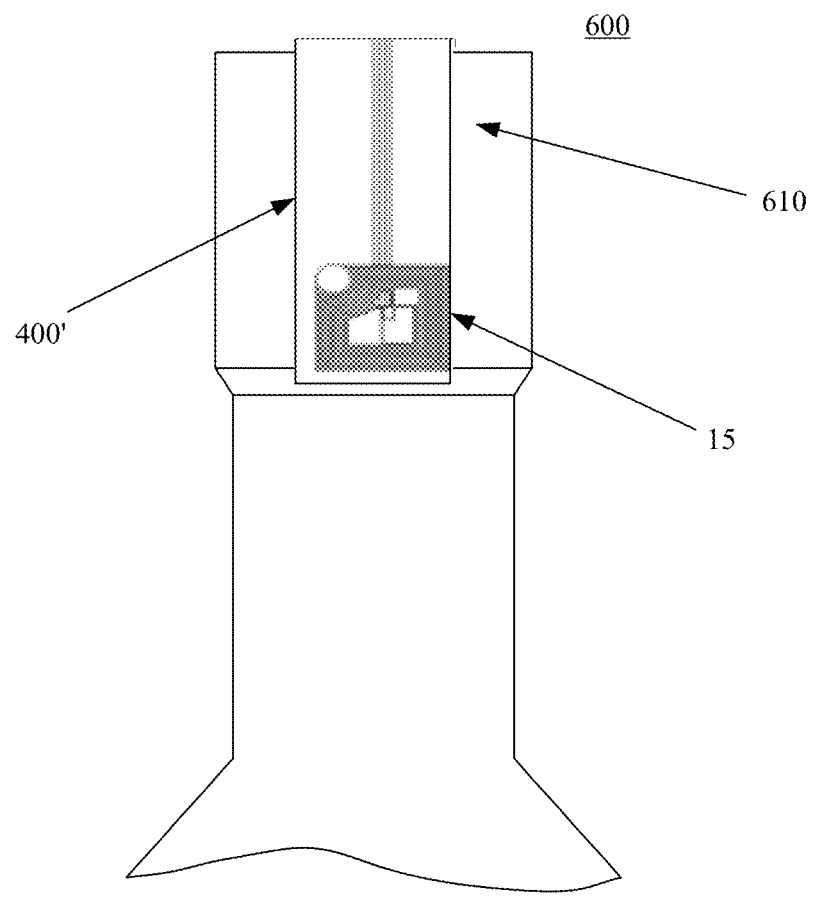

FIGS. 8(A) to 8(C) are brief top views illustrating the adhering method of the sticker with IC tag 400 in UHF band involved in the second embodiment. FIGS. 9(A) to 9(C) are brief top views illustrating the adhering method of the sticker with IC tag 400' in HF band involved in the second embodiment.

The covered container 600 in the present second embodiment is a wine bottle having a cover portion 610 constituted by metal materials such as metal heat shrinkable cap. In this case, the communication of the IC tag may sometimes be affected by the metal heat shrinkable cap due to the adhering position of the sticker with IC tag 400.

First, if the sticker with IC tag 400 is installed to the covered container 600 as shown in FIG. 8(A), the impedance adjustment circuit 11 does not coincide with the cover portion 610 at all. Therefore, communication is not affected, which is the ideal status.

Next, if the sticker with IC tag 400 is installed to the covered container 600 as shown in FIG. 8(B), a portion of the impedance adjustment circuit 11 coincides with the cover portion 610. In this case, communication may still be continued, which is also fine.

Then, if the sticker with IC tag 400 is installed to the covered container 600 as shown in FIG. 8(C), the impedance adjustment circuit 11 is completely shielded by the cover portion 610. Therefore, communication cannot be performed.

Therefore, in case that the cover portion 610 is constituted by metal materials, it is necessary to make at least a portion of the impedance adjustment circuit 11 not coincide with the cover portion 610 when installing the sticker with IC tag 400 to the covered container 600.

Further, for reasons similar to the above, when installing the sticker with IC tag 400' in HF band to the covered container 600 as shown in FIGS. 9(A) to 9(C), it is necessary to make at least a portion of the loop circuit for antenna 15 not coincide with the cover portion 610.

Further, the sticker with IC tag in the present embodiment is adhered outside of the metal heat shrinkable cap, but may also be adhered inside.

Third Embodiment

Figure 10A:
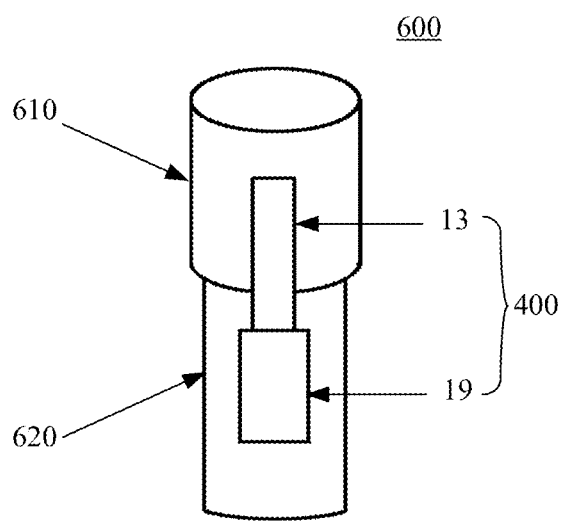
FIGS. 10(A) to 10(D) are brief perspective views illustrating the adhering method of the sticker with IC tag involved in the third embodiment of the present disclosure.
Figure 10B:
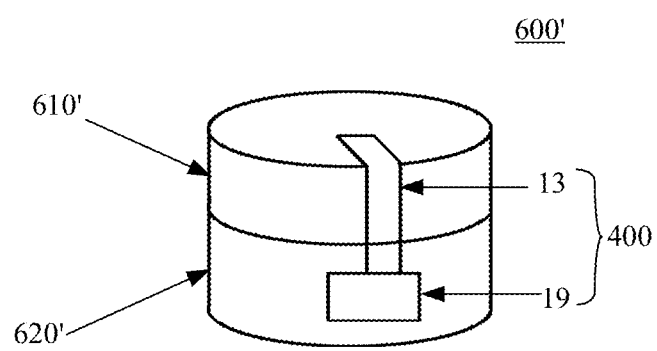
Figure 10C:
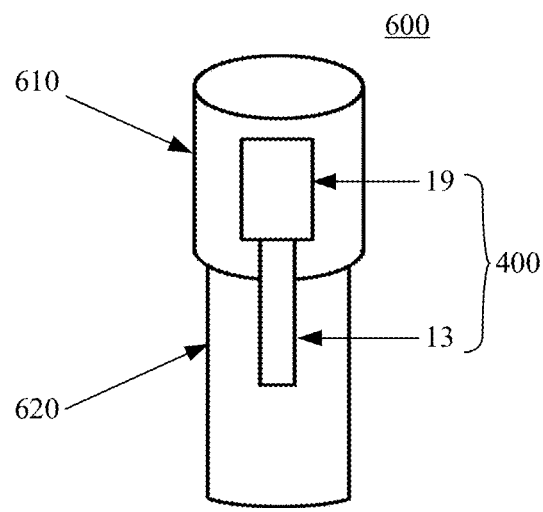
Figure 10D:
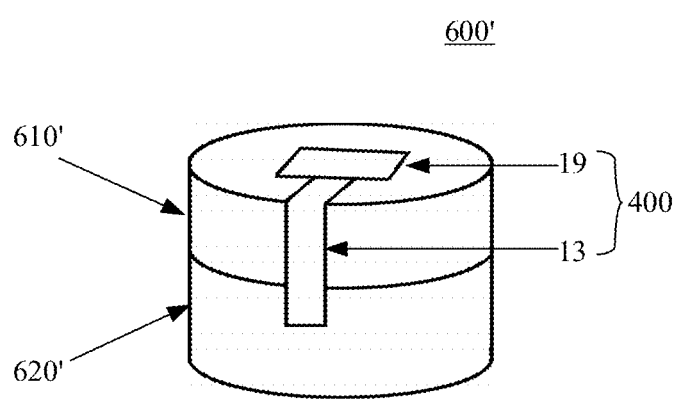

The present disclosure is not only applicable to containers with high covers such as wine bottles, instead it is applicable to all containers with container body and cover. The shapes of these covered containers comprise for example a covered container 600 with a higher cover portion 610 as shown in FIGS. 10(A) and 10(C), and a covered container 600' with a lower cover portion 610' as shown in FIGS. 10(B) and 10(D). In the following description, the method for adhering the sticker with IC tag to covered containers with various shapes will be illustrated with reference to FIGS. 10(A) to 10(D).

FIGS. 10(A) to 10(D) are brief perspective views illustrating the adhering method of the sticker with IC tag 400 involved in the third embodiment. Further, in FIGS. 10(A) to 10(D), portions other than the disconnection detection portion 13 and the antenna portion 19 of the sticker with IC tag 400 are omitted in order to simplify explanation.

First, as shown in FIG. 10(A), the sticker with IC tag 400 is constituted by a higher cover portion 610 and a container body 620. When installing the sticker with IC tag 400 to the covered container 600, the disconnection detection portion 13 is disposed on the side of the container body 620 and the side of the cover portion 610. Since the height of the cover portion 610 is relatively high, the disconnection detection portion 13 does not reach the top surface of the cover portion 610. Further, the antenna portion 19 is disposed on the container body 620 side.

Next, as shown in FIG. 10(B), the sticker with IC tag 400 is constituted by a lower cover portion 610' and a container body 620'. When installing the sticker with IC tag 400 to the covered container 600', the disconnection detection portion 13 is disposed from the side of the container body 620' and the side of the cover portion 610' to the top surface of the cover portion 610' since the height of the cover portion 610 is relatively low. Further, the antenna portion 19 is disposed on the container body 620' side.

Further, in FIGS. 10(A) and 10(B), when installing the sticker with IC tag 400 to the covered containers 600, 600', the antenna portion 19 is disposed on container body 620, 620' side, but is not limited to this. For example, the antenna portion 19 may be disposed on the cover portion 610, 610' side as shown in FIGS. 10(C) and 10(D).

The embodiments and modifications embodiments of the present disclosure are illustrated above. However, various omissions, replacements, and modifications may be made within the scope of the idea of the present disclosure.

REFERENCE NUMERALS

10 Radiation element (Antenna); 11, 11' Impedance adjustment circuit; 12 IC chip; 13 Disconnection detection circuit (Disconnection detection portion); 14, 14' Substrate; 15 Loop circuit for antenna; 16 Incision; 17 Brittle layer; 18 Breach; 19 Antenna portion; 41 Tag paper (Tag portion); 42, 45 Adhesion layer; 43, 44 Conductor layer; 46 Enhanced layer; 100, 100', 101, 101', 102 IC Tag insert; 400, 400' sticker with IC tag; 600, 600' Covered container; 610, 610' Cover portion; 620, 620' Container body

What is claimed is:

1. An IC tag sticker configured to be installed on a covered container, the sticker comprising:
   (1) a substrate comprising i) a first portion configured to stay intact after opening of the container; ii) a second portion configured to be destroyed after the opening of the container, and iii) a plurality of incisions, which separate the first and the second portions of the substrate before the opening of the container, wherein the second portion is configured to stretch across both a cover of the container and a body of the container;
   (2) an antenna comprising an intact portion, wherein the intact portion of the antenna is on the first portion of the substrate;
   (3) an IC chip on the first portion of the substrate, the IC chip is coupled with the intact portion of the antenna; and
   (4) a disconnection detection circuit comprising a ring conductor coupled to the IC chip, wherein at least a portion of the disconnection detection circuit is on the second portion of the substrate.

2. The IC tag sticker of claim 1, wherein the substrate is a sheet-shaped substrate.

3. The IC tag sticker of claim 1, wherein the intact portion of the antenna comprises a radiation element and an impedance adjustment circuit, and wherein the IC chip is coupled to the impedance adjustment circuit.

4. The IC tag sticker of claim 1, wherein the intact portion of the antenna comprises a loop circuit.

5. The IC tag sticker of claim 1, further comprising an enhanced layer on the first portion of the substrate.

6. A covered container having the IC tag sticker of claim 1.

7. A method of installing a sticker with an IC tag: comprising installing on a covered container a sticker comprising:
   (1) a substrate comprising i) a first portion; ii) a second portion, and iii) a plurality of incisions between the first and the second portions;
   (2) an antenna comprising an intact portion, wherein the intact portion of the antenna is on the first portion of the substrate;
   (3) an IC chip on the first portion of the substrate, the IC chip is coupled with the intact portion of the antenna; and
   (4) a disconnection detection circuit comprising a ring conductor coupled to the IC chip, wherein at least a portion of the disconnection detection circuit is on the second portion of the substrate, wherein the second portion of the substrate stretches across both a cover of the container and a body of the container and wherein upon opening the container, the first and the second portions of the substrate are separated along the plurality of incisions, so that the first portion stays intact and the second portion is being destroyed.

8. The method of claim 7, wherein the disconnection detection circuit is disposed on a portion of the cover of the container and a portion of the body of the container.

9. The method of claim 7, wherein the antenna is disposed on a portion of the body of the container.

10. The method of claim 7, wherein the antenna is disposed on a portion of the cover of the container.

11. The method of claim 7, wherein the antenna comprises an impedance adjustment circuit or a loop circuit and the cover of the container is a metal heat shrinkable cap and the sticker is installed so that at least a portion of the impedance adjustment circuit or a portion of the loop circuit does not coincide with the metal heat shrinkable cap.

* * * * *